Patented Jan. 13, 1925.

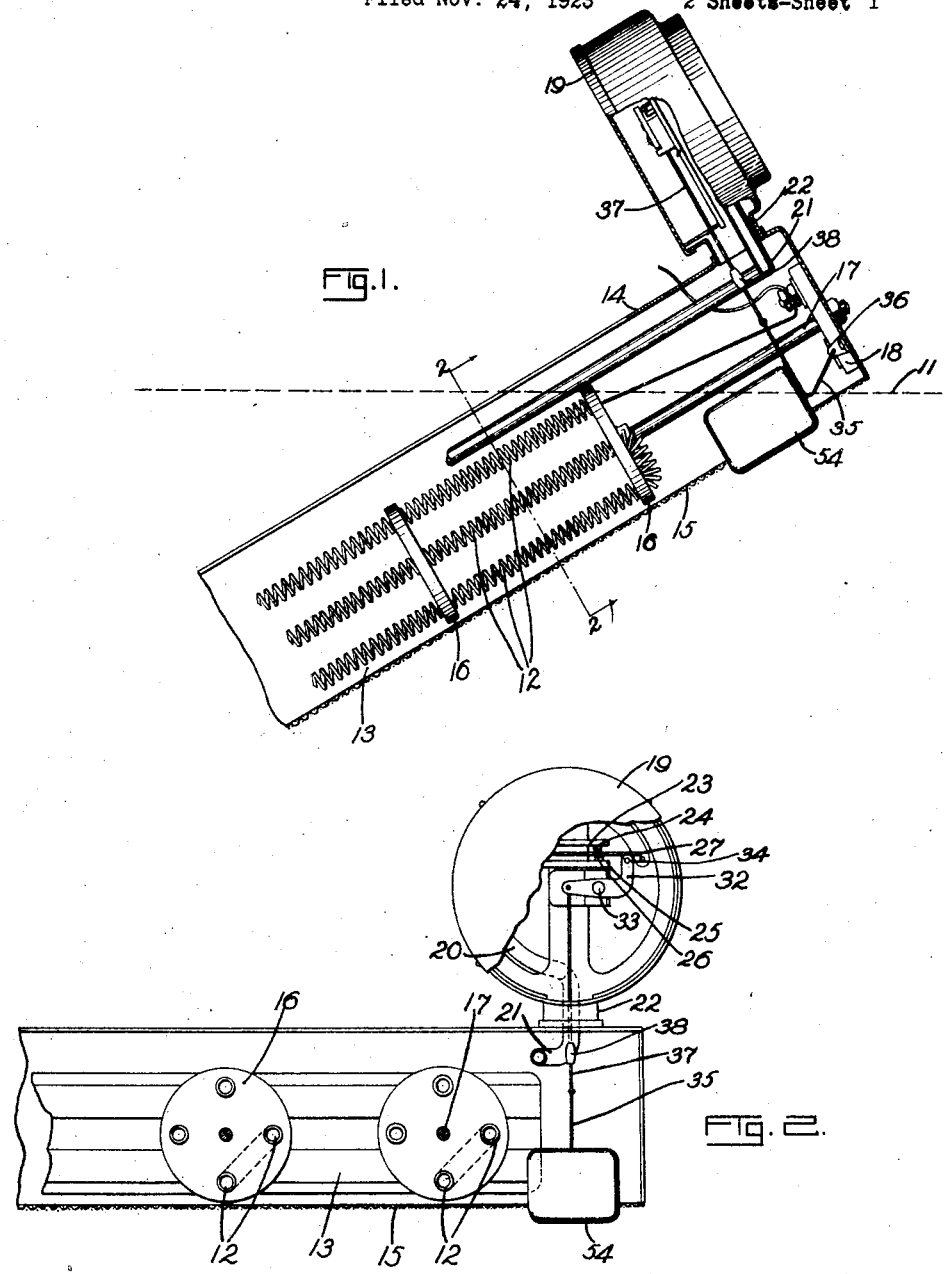

1,523,019

UNITED STATES PATENT OFFICE.

MORRIS KASSER, OF SAN FRANCISCO, CALIFORNIA.

FLUID-HEATING-CONTROL SYSTEM.

Application filed November 24, 1923. Serial No. 676,857.

*To all whom it may concern:*

Be it known that I, MORRIS KASSER, a citizen of the United States, and a resident of the city and county of San Francisco, in the State of California, have invented a new and useful Fluid-Heating-Control System, of which the following is a specification.

This invention relates to a control system, and more particularly to a system for controlling the heating of a liquid, whereby abnormal or dangerous conditions may be obviated.

I have found my system useful, for example, in connection with the heating of a body of oil or other combustible liquid, by the aid of an electrical current. Such a heated body of liquid is useful to "process" eggs, as described in prior issued patents, and it is necessary for best results to heat the liquid bath into which the eggs are dipped, to a temperature considerably higher than that of the room where the process is carried on. The heating elements are for this purpose immersed in the liquid, and may be operated with a heavy current. Since there is a variation in the liquid level, due to the introduction into, and removal of eggs from the bath, there is a likelihood that at least a part of the elements may become exposed to the air. The high heat developed near the surface of these elements, together with the access of oxygen to the surface, is quite likely to cause any particle of oil adhering as a film to the elements, to burn, and thereby possibly start a serious conflagration. It is one of the objects of my invention to prevent such occurrences, by ensuring that the elements must be completely covered by the liquid before they may be energized.

I accomplish this desirable result by providing a device operated by a float, and actuating contacts controlling the current flow to the elements. I find it convenient to incorporate this control in the same apparatus that serves to control the temperature of the liquid. It is thus another object of my invention to combine temperature and safety control for a liquid in a common device.

It is still another object of my invention to make it possible to control the operation of a heating device in response to variations in the level of a liquid which is heated thereby.

My invention possesses other advantageous features, some of which, with the foregoing, will be set forth at length in the following description, where I shall outline in full that form of the invention which I have selected for illustration in the drawings accompanying and forming part of the present specification. Although I have shown in the drawings but one embodiment of my invention, I do not desire to be limited thereto, since the invention as defined in the claims may be embodied in other forms also.

Referring to the drawings:

Figure 1 is a view, mainly in section, of a part of a heating element and the control devices mounted thereon;

Fig. 2 is a sectional view, taken along plane 2—2 of Fig. 1; and

Figure 3:
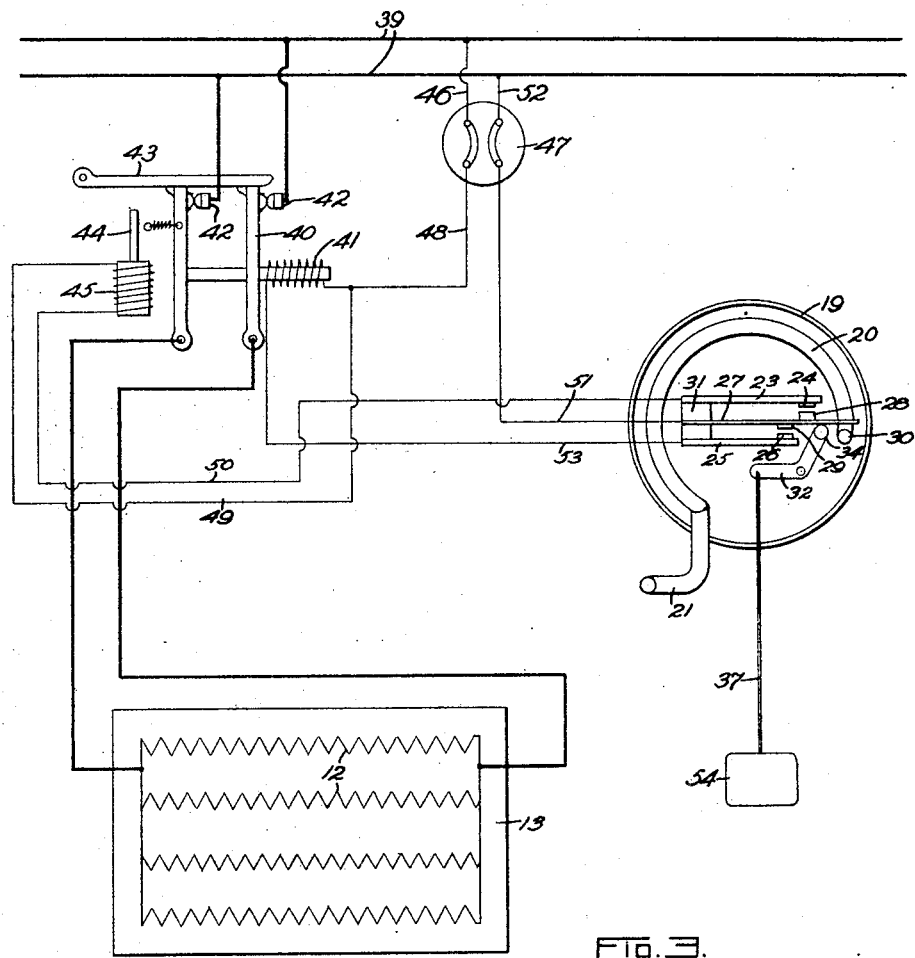
Fig. 3 is a wiring diagram of a control system embodying my invention.

The normal level of oil or other liquid that is heated is indicated at 11 in Fig. 1. In the present instance, local heating of the liquid is effected by the immersion of heating units 12 supplied with electric current. These heating units may be conveniently arranged in an open box structure 13, comprising sheet metal ends 14, which are bent as shown in Fig. 2 to a right angle, and a wire mesh bottom 15. The heating units are shown as helical coils of resistance wire, supported at intervals by insulation discs 16, through which the coils are threaded. Only a portion of the heating element is illustrated, since its particular construction forms no part of my present invention; and for this reason, also, it is unnecessary to describe the structure thereof at further length. It is sufficient to mention that rods 17 may be fastened to ends 14 and serve as supports for the discs 16; further that a connection board 18 may also be provided on the end 14.

In order to regulate the oil temperature within narrow limits, a thermostat arrangement is provided. This may take the form of the usual Bourdon tube pressure gauge 19, the tube 20, (Fig. 3) of which is connected to a closed container 21 dipping into the liquid and containing a readily volatilizable fluid, such as ether. As the temperature varies, the gas pressure in the tube 20 varies, and the tube consequently alters its form, so that it expands as the temperature increases. In order to permit the insertion of the container 21 into the oil, the gauge 19 is supported on a hollow pedestal 22 communicating with the interior of the element 13.

The movement of tube 20 is caused to control the heating element 13. Since these elements use electrical energy for their operation, it is possible to operate controlling contacts by this movement, and such an arrangement is shown in Fig. 3. There are three contact arms shown; an upper arm 23 which carries the stationary contact 24, a lower arm 25 carrying the stationary contact 26, and a central spring arm 27 carrying the cooperating movable contacts 28 and 29. The expansible tube 20 carries a post 30 that is disposed below the free end of arm 27, and arranged, when expanded sufficiently, to raise this free end and thereby urge contact 28 into connection with contact 24. If the tube 20 contracts sufficiently, it will permit arm 27 to drop to its free position, in which contacts 26 and 29 engage. All of the arms are insulated from each other on the common support 31. The engagement of contacts 24 and 28, in response to a definite high temperature, serves to deenergize the element 13, whereas the engagement of contacts 26 and 29, in response to a definite low temperature serves to energize the element 13. While the lever 27 is in an intermediate position, the element 13 remains either energized or deenergized, depending upon which of its two extreme positions it occupied last. How this control is accomplished will be described in detail hereinafter. This type of control maintains the temperature within narrow limits.

Since the liquid level may vary considerably, it sometimes happens that a substantial portion of the heating units 12 becomes uncovered except for a thin film of oil that adheres thereto. Under such circumstances, the heat developed by that portion is not conducted away by the surrounding oil at a fairly rapid rate, as when it is immersed; instead, a very high temperature near the surface of the heating wire is developed. The film of oil is then apt to ignite, and the flames may spread to other parts of the apparatus. This is all the more likely where the bath of oil is used to process eggs, since inflammable matter such as chicken feathers is apt to be deposited on the heating coils. The thermostat alone cannot remedy this condition, since it responds only to temperature below the oil level, which is much lower than that near the exposed wire surfaces. Even if the container 21 becomes entirely exposed, still it is subjected to air that is remote from the dangerous zone, and the thermostat would not respond until the conflagration reached serious proportions.

In order to remedy these conditions, I use another device for lifting arm 27 into its upper deenergizing position whenever the liquid level recedes below a desired point. For this purpose I provide a bell crank lever 32 supported on a pivot 33 located a little below the contact arms. This lever also carries a projection 34 that is arranged to coact with the lower surface of arm 27 and urge it upwardly against the stationary contact 24. While the liquid level is high, the lever 32 is held in a position such that it does not interfere with the operation of arm 27 by the thermostat. This is accomplished by the aid of a small float 54 fastened to a bent wire 35. This wire is pivoted at one end in a stationary standard 36 (Fig. 1), and at the other end, to a rod 37. This rod is adjustable in length, as by a turnbuckle 38, and is pivotally connected to the extremity of one of the arms of lever 32. When the float rises, the rod 37 and the wire 35 take the positions of Figs. 1 and 2; the lever 32 is rotated in a clockwise direction, moving projection 34 downward out of the way of arm 27. In case the level of the liquid falls, the float 54 pulls rod 37 downward, and rotates lever 32 in a counter-clockwise direction. The projection 34 raises arm 27, so that contact is made between contacts 24 and 28, and the element 13 is deenergized. It is to be noted that while the level of the liquid is normal, there is no interference whatsoever with the operation of the thermostat control. Furthermore, there is a wide choice as regards the particular mode of control in response to liquid level; but the apparatus shown is convenient, since both temperature and level control are combined in a single mechanical device.

The circuit control is most clearly illustrated in Fig. 3. The mains 39 supply current to this element through a double pole switch 40. An electromagnet coil 41 serves when energized, to pull the switch arms to closed position against stationary contact pieces 42. A latch 43 serves to hold the switch 40 closed even after coil 41 is deenergized, but may be released by a plunger 44. This plunger is operated by an electromagnet 45. In the position shown, the switch 40 is closed and latched. The element 13 is supplied with electrical energy. As soon as the temperature reaches its high limit, tube 20 expands, and projection 30 lifts arm 27, so as to make contact between contacts 24 and 28. When this occurs, a control current is permitted to flow through coil 45, through the following circuit:—upper main 39, lead 46, left hand pole of a snap switch 47, leads 48 and 49, coil 45, lead 50, upper arm 23, contacts 24 and 28, central arm 27, lead 51, right hand pole of switch 47, and lead 52 back to the lower main 39. The coil 45 being energized, the latch 43 is released, and switch 40 opens. The heating element 13 is deenergized. As soon as the temperature is reduced to the lower limit, the tube 20 contracts sufficiently to permit arm 27 to bring contacts 26 and 29 into engagement. The circuit for coil 41 is then completed, as follows:—from upper main 39, lead 46, left hand pole of snap switch 47, lead 48, coil 41, lead 53, lower arm 25, contacts 26 and 29, central arm 27, lead 51, right hand pole of switch 47, and lead 52 back to the lower main 39. The coil 41 acts to pull switch 40 closed, and it is retained in this position by catch 43. The cycle of operations may now be repeated.

If at any time the level of the oil recedes to an undesired point, float 54 pulls lever 32 to such a position that projection 34 urges contacts 24 and 28 into engagement, and consequently coil 45 is energized. This energization releases catch 43, switch 40 opening and deenergizing the element 13.

I claim:

1. Means for heating a body of liquid the level of which is variable, and means responsive to variations in the level for controlling the heating means.

2. Means for heating a body of liquid the level of which is variable, means responsive to temperature of the liquid for controlling the heating means, and means responsive to level variations for controlling the heating means.

3. Means for heating by an electric current, a body of liquid the level of which is variable, and means responsive to variations in the level for controlling the energization of the heating means.

4. An electrical heating element for heating a body of liquid the level of which is variable, means responsive to temperature of the liquid for controlling the energization of the element, and means responsive to level variations for controlling the energization of the element.

5. An electrical heating element for heating a body of liquid the level of which is variable, an energizing circuit for said element, a controlling device for said circuit, and means responsive to variations in the liquid level for operating said device to control the circuit.

6. An electrical heating element for heating a body of liquid the level of which is variable, an energizing circuit for said element, a controlling device for said circuit, means responsive to temperature variations of the liquid for operating said device, and means responsive to variations in the liquid level for operating said device.

7. An electrical heating element for heating a body of liquid the level of which is variable, an energizing circuit for said element, and means whereby both temperature variations and liquid level variations may control said circuit, comprising a stationary contact, a movable cooperating contact, a thermal responsive device arranged to move the movable contact, and a device responsive to variations in liquid level for moving said contact.

8. Means for heating a body of liquid the level of which is variable, and a common means whereby both temperature variations and liquid level variations may control the heating means.

9. Means for heating a body of liquid the level of which is variable, said means being adapted to be inserted into the liquid, whereby the heat developed thereby may be transferred to the liquid, said means when exposed by a drop in level being capable of producing an objectionably high temperature in the neighborhood of the exposed portion, and means operative in response to such lowering of the level for reducing the heat developed by the heating means.

10. Means for heating a body of liquid the level of which is variable, said means being adapted to be inserted into the liquid, whereby the heat developed thereby may be transferred to the liquid, said means when exposed by a drop in level being capable of producing an objectionably high temperature in the neighborhood of the exposed portion, means operative in response to such lowering of the level for reducing the heat developed by the heating means, and means responsive to temperature of the liquid for controlling the heating means.

11. Means for heating a body of liquid the level of which is variable, said means being adapted to be inserted into the liquid, whereby the heat developed thereby may be transferred to the liquid, said means when exposed by a drop in level being capable of producing an objectionably high temperature in the neighborhood of the exposed portion, and means operative in response to such lowering of the level for reducing the heat developed by the heating means, comprising a float switch controlling the heat generated by the heating means.

12. Means for heating a body of liquid the level of which is variable, said means being adapted to be inserted into the liquid, whereby the heat developed thereby may be transferred to the liquid, said means when exposed by a drop in level being capable of producing an objectionably high temperature in the neighborhood of the exposed portion, and means for reducing the heat developed by the heating means, operative to prevent high temperature rise of the liquid as well as objectionably high temperature at or near the exposed part of the heating means.

13. Means for heating a body of liquid the level of which is variable, said means being adapted to be inserted into the liquid, whereby the heat developed thereby may be transferred to the liquid, said means when exposed by a drop in level being capable of producing an objectionably high temperature in the neighborhood of the exposed portion, and means for reducing the heat developed by the heating means, operative to prevent high temperature rise of the liquid as well as objectionably high temperature at or near the exposed part of the heating means, comprising a control arm, means responsive to temperature variations of the liquid to move the arm, and means responsive to level variations to move said arm.

14. An electrical heating element for heating a body of liquid the level of which is variable, said element being adapted to be inserted into the liquid, whereby the heat developed thereby may be transferred to the liquid, said element when having its heating wire exposed due to a drop in level of the liquid being capable of producing an objectionably high temperature in the neighborhood of the exposed portion, an energizing circuit for said element, and means controlling said circuit so as to reduce the heat developed by the element in response to such lowering of the liquid level.

15. An electrical heating element for heating a body of liquid the level of which is variable, said element being adapted to be inserted into the liquid, whereby the heat developed thereby may be transferred to the liquid, said element when having its heating wire exposed due to a drop in level of the liquid being capable of producing an objectionably high temperature in the neighborhood of the exposed portion, an energizing circuit for said element, means controlling said circuit so as to reduce the heat developed by the element in response to such lowering of the liquid level, and means responsive to temperature of the liquid, also controlling said circuit.

16. An electrical heating element for heating a body of liquid the level of which is variable, said element being adapted to be inserted into the liquid, whereby the heat developed thereby may be transferred to the liquid, said element when having its heating wire exposed due to a drop in level of the liquid being capable of producing an objectionably high temperature in the neighborhood of the exposed portion, an energizing circuit for said element, and means controlling said circuit so as to reduce the heat developed by the element in response to such lowering of the liquid level, comprising a float switch operated by variations in the liquid level.

17. An electrical heating element for heating a body of liquid the level of which is variable, said element being adapted to be inserted into the liquid, whereby the heat developed thereby may be transferred to the liquid, said element when having its heating wire exposed due to a drop in level of the liquid being capable of producing an objectionably high temperature in the neighborhood of the exposed portion, an energizing circuit for said element, and means for so controlling said circuit as to reduce the heat developed by the element, operative to prevent high temperature rise of the liquid as well as objectionably high temperature in the neighborhood of the exposed part of the heating means.

18. An electrical heating element for heating a body of liquid the level of which is variable, said element being adapted to be inserted into the liquid, whereby the heat developed thereby may be transferred to the liquid, said element when having its heating wire exposed due to a drop in level of the liquid being capable of producing an objectionably high temperature in the neighborhood of the exposed portion, an energizing circuit for said element, and means for so controlling said circuit as to reduce the heat developed by the element, operative to prevent high temperature rise of the liquid as well as objectionably high temperature in the neighborhood of the exposed part of the heating means, comprising an arm, a contact carried thereby, means responsive to temperature variations to move the arm, and means responsive to level variations to move the arm.

19. An electrical heating element for heating a body of liquid the level of which is variable, said element being adapted to be inserted into the liquid, whereby the heat developed thereby may be transferred to the liquid, said element when having its heating wire exposed due to a drop in level of the liquid being capable of producing an objectionably high temperature in the neighborhood of the exposed portion, an energizing circuit for said element, an electromagnetically operated switch in said circuit, and means for controlling said switch, comprising a stationary contact, a movable contact arranged to engage the stationary contact, a float arranged to be placed in the liquid, and mechanical connections between the float and the movable contact, whereby the electro-magnetic switch is opened when contact is made between the two contacts in response to a drop in liquid level.

20. An electrical heating element for heating a body of liquid the level of which is variable, said element being adapted to be inserted into the liquid, whereby the heat developed thereby may be transferred to the liquid, said element when having its heating wire exposed due to a drop in level of the liquid being capable of producing an objectionably high temperature in the neighborhood of the exposed portion, an energizing circuit for said element, an electromagnetically operated switch in said circuit, and means for controlling said switch, comprising a pair of stationary contacts, a contact arm playing between said contacts and having a free position that causes it to engage that one of the stationary contacts which controls the closing of the switch, a float operating on a definite drop in liquid level to move said arm toward the other contact and thereby cause the switch to open, and a thermal responsive element adapted also to urge said arm into said latter position upon a definite temperature rise of the liquid, the connections from the arm to the float and to the thermal responsive element being of such a nature that said arm is free to rest against the switch closing contact while the temperature is below the predetermined high value, and while the liquid level is above the definite low point.

In testimony whereof, I have hereunto set my hand.

MORRIS KASSER.